No. 785,389. PATENTED MAR. 21, 1905.
N. L. & W. W. TUCK.
VAPORIZER AND IGNITER FOR OIL ENGINES.
APPLICATION FILED JULY 22, 1903. RENEWED FEB. 21, 1905.
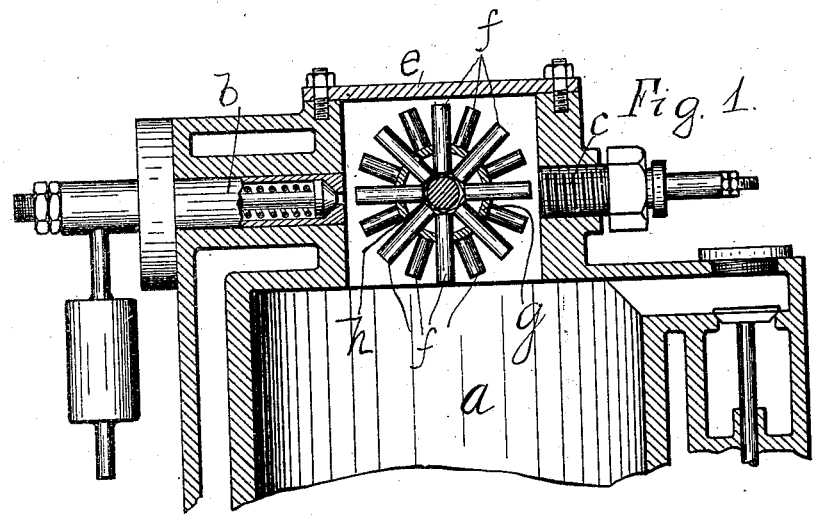
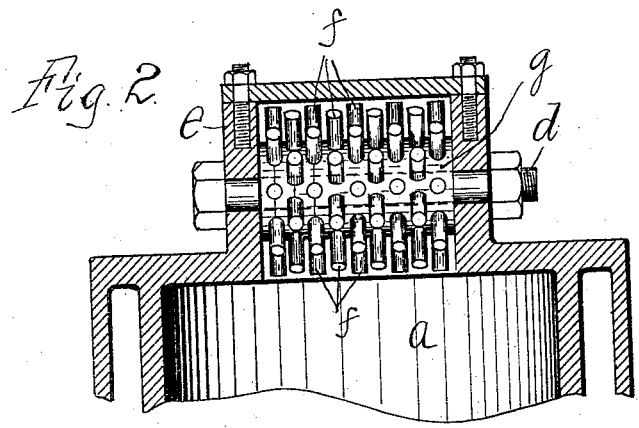
WITNESSES:
INVENTORS.
BY
ATTORNE No. 785,389.         Patented March 21, 1905.

UNITED STATES PATENT OFFICE.

NELSON L. TUCK AND WILLIAM W. TUCK, OF BROOKLYN, NEW YORK.

VAPORIZER AND IGNITER FOR OIL-ENGINES.

SPECIFICATION forming part of Letters Patent No. 785,389, dated March 21, 1905.

Application filed July 22, 1903. Renewed February 21, 1905. Serial No. 246,781.

*To all whom it may concern:*

Be it known that we, NELSON L. TUCK and WILLIAM W. TUCK, citizens of the United States, and residents of Brooklyn, in the county of Kings and State of New York, have invented a certain new and useful Improvement in Vaporizers and Igniters for Oil-Engines, of which the following is a specification.

This invention relates to igniters for internal-combustion engines, the main object of the invention being to provide an igniter of a nature such that it will afford a large heating-surface on which the fuel will be sprayed and then be ignited by the heat developed in the igniter as the mixture or charge is compressed by the piston of the engine after the said igniter once reaches a given temperature and the engine is started and operated a short while by ordinary means, as alcohol fuel and an ordinary igniter.

The invention is embodied in the apparatus shown in the accompanying drawings, forming part hereof, in which—

Figures 1 and 2 are views, partly in section, taken at right angles to each other.

In the drawings reference $a$ marks the cylinder, $b$ a fuel-injector, and $c$ an igniter of any usual or known character, while $d$ marks a shaft or rod secured in the housing $e$, which forms part of the cylinder-head.

The reference $f$ marks a series of arms arranged to project radially from the shaft or carrier $d$, as shown, the arms being staggered by preference.

The reference $g$ marks a retaining-cylinder through which the arms $f$ project. The arms $f$ may be tapped into rings $h$, which slide on the rod $d$, and the cylinder $g$ may be in one piece, or the cylinder $g$ may be made in rings which have semicircular radial grooves in their sides, the grooves being staggered, and the arms $f$ may in such event be cast integrally with the rings $h$.

The cylinder $g$ and arms $f$, or merely the latter, may be made of any material, such as cast-iron, which possesses the properties required.

The engine is started by the use of alcohol and an ordinary igniter and is operated until the igniter $f$ or $f g$ is hot enough to rise to a firing temperature during the compression of the charge after having vaporized the fuel sprayed thereon by the injector.

What is claimed is—

1. A vaporizer and igniter consisting of a retainer and arms or projections extending therethrough and arranged in circular series in planes transverse to the axis of the retainer, the arms or projections in one plane being staggered relatively to the arms or projections in the adjacent planes, combined with means for spraying oil on the exterior of said igniter, said spraying means being independent of the igniter.

2. A vaporizer and igniter consisting of a retainer, cylindrical in form, a rod concentric therewith, rings on said rod, and arms or projections extending from said rings through said retainer, combined with means for spraying oil on said vaporizer, said means being independent of said igniter.

Signed at New York, in the county of New York and State of New York, this 21st day of July, A. D. 1903.

NELSON L. TUCK.
WILLIAM W. TUCK.

Witnesses:
FRANK RYALL,
R. W. BARKLEY.